Sept. 3, 1940.   C. D. LOWRY   2,213,402
DIVISION, CORNER, AND REVERSE BAR
Filed Aug. 23, 1937   3 Sheets-Sheet 1

Inventor
CLYDE D. LOWRY.
By Frank Fraser
Attorney

Sept. 3, 1940.  C. D. LOWRY  2,213,402
DIVISION, CORNER, AND REVERSE BAR
Filed Aug. 23, 1937  3 Sheets-Sheet 2

Inventor
CLYDE D. LOWRY.
By Frank Fraser
Attorney

Sept. 3, 1940.   C. D. LOWRY   2,213,402
DIVISION, CORNER, AND REVERSE BAR
Filed Aug. 23, 1937   3 Sheets-Sheet 3
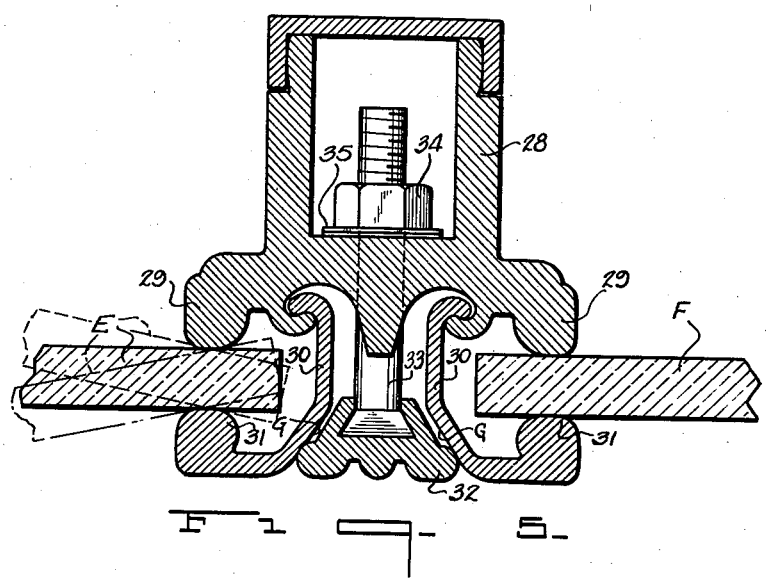
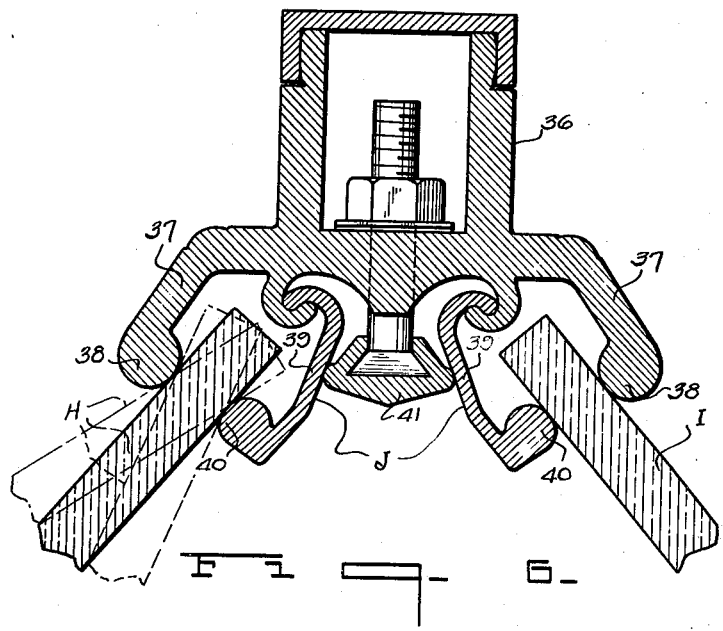
Inventor
CLYDE D. LOWRY.
By Frank Fraser
Attorney Patented Sept. 3, 1940

2,213,402

UNITED STATES PATENT OFFICE 2,213,402

DIVISION, CORNER, AND REVERSE BAR

Clyde D. Lowry, Toledo, Ohio, assignor to Libbey-Owens-Ford Glass Company, Toledo, Ohio, a corporation of Ohio Application August 23, 1937, Serial No. 160,369

4 Claims. (Cl. 189—78)

The present invention relates to improvements in the construction of division, corner, and reverse bars adapted for joining the adjacent edges of two sheets of glass in store and window fronts.

In the installation of store and window fronts, it is quite common to mount two or more sheets of glass either in the same plane or in planes at an angle to one another. In such constructions, it is desirable to make use of division, corner or reverse bars for joining the adjacent edges of the glass sheets depending upon the particular arrangement of the sheets relative to one another. Because of the many varied conditions existing in the field, it has been difficult for the store and window front metal manufacturer to provide a truly satisfactory universal type of construction applicable to the different forms of bars required for different situations. Improperly designed bars of this nature often result in glass breakage as well as spoiling the appearance of the store front.

It is the primary object of this invention to provide an improved type of construction for division, corner and reverse bars which is universally applicable to all three types of bars, whereby they are automatically adjustable to maintain the glass sheets at any desired angle in the store or window front.

Another object of the invention is to provide such a universal type construction for division, corner and reverse bars embodying means effecting a yielding cushion pressure against the glass sheets whereby to permit expansion and contraction as well as to take up vibrations in the bar, thereby reducing to a minimum, if not entirely eliminating, the liability of glass breakage from these causes.

Another object of the invention is to provide such a construction for division, corner, and reverse bars wherein the principle of operation of all three bars is the same and wherein each bar is provided with means acting as a gauge to indicate when sufficient pressure has been applied to the glass sheets and being further constructed in a manner that two sheets of glass of varying thickness may be used while the pressure upon the sheets is uniformly maintained.

Other objects and advantages of the invention will become more apparent during the course of the following description, when taken in connection with the accompanying drawings.

In the drawings, wherein like numerals are employed to designate like parts throughout the same:

Fig. 5 is a similar sectional view of a division bar constructed in accordance with the invention; and Fig. 6 is a similar view of a reverse bar embodying the same principles of construction and operation as the corner and division bars.

As stated above, it is the aim of this invention to provide an improved type of construction which is equally applicable to division, corner, and reverse bars so that the principal of operation of the three bars is identical and wherein the said bars are universal in automatically adjusting themselves to all angles possible in a store or window front. Generally speaking, each bar comprises a rear vertical stationary member or body portion anchored at the top and bottom for rigidity and having spaced stationary glass contacting portions in the form of beads engaging one face of the glass sheets. Pivotally associated with the rear stationary member or body portion are wing members also having glass engaging portions in the form of beads contacting the opposite face of the glass sheets. Arranged between the wing members and carried by the rear member or body portion is a wedge element operable to simultaneously move said wing members into glass engaging position, whereby the glass sheets are firmly clamped between the glass contacting beads of said rear member and wing members respectively.

Figure 1:
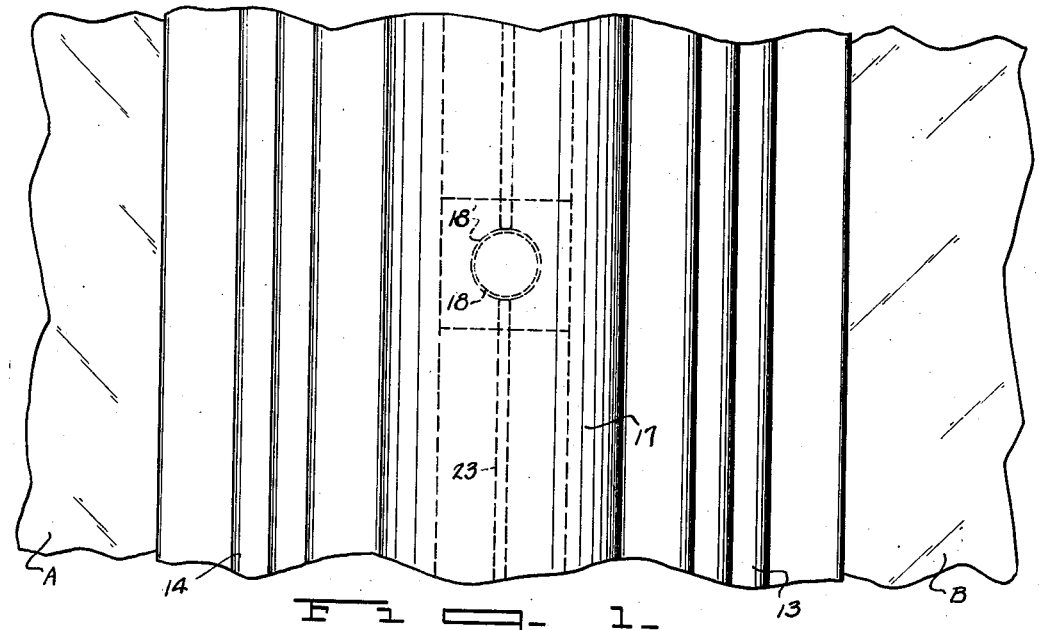
Fig. 1 is a fragmentary elevation of a corner bar constructed in accordance with the present invention.
Figure 2:
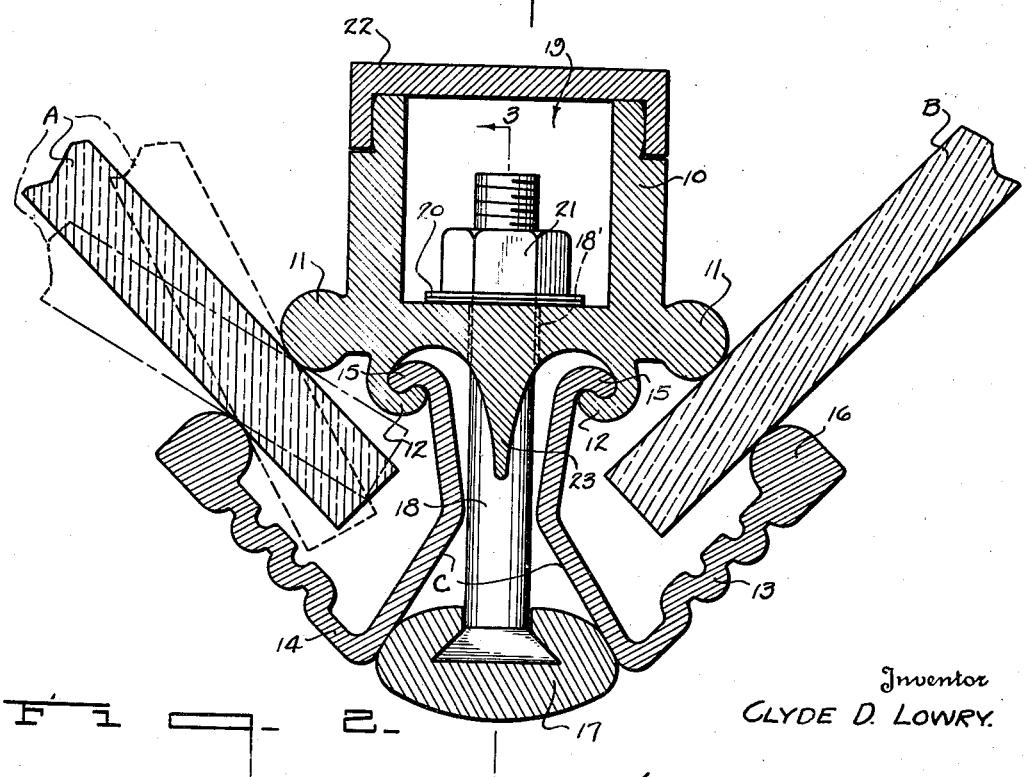
Fig. 2 is a horizontal transverse section of view therethrough.
Figure 3:
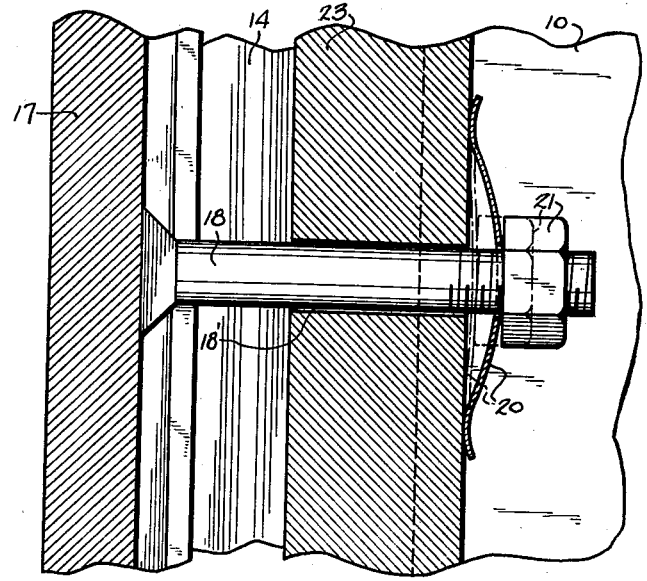
Fig. 3 is a sectional view taken substantially on line 3—3 of Fig. 2.

With reference particularly to Figures 1, 2 and 3, the invention is shown therein as applied to a corner bar for securing two sheets of glass A and B which extend at an angle toward the back of the window or store front. The corner bar comprises a vertical rear member or body portion 10 in the form of a stationary channel member which is anchored at the top and bottom thereof for rigidity. The channel member 10 is provided at the front and at opposite sides thereof with the laterally projecting glass engaging beads 11 which are adapted to engage the inner faces of the glass sheets A and B, said beads having curved glass contacting surfaces so as to permit of angular adjustment of the glass sheets through a relatively wide range, as indicated by the broken lines in Fig. 2.

The channel member 10 is also provided at the front thereof, inwardly of the beads 11, with forwardly and inwardly curved lips 12 with which are pivotally associated the wing members 13 and 14. The curved lips 12 serve as one-half of a hinge, while the wing members 13 and 14 are provided with hook-shaped flanges 15 interlocking with said lips and serving as the other half of the hinge. With this construction, it will be evident that the wing members can be readily swung toward or away from one another, with the flanges 15 hinging on the lips 12.

The wing members 13 and 14 are of substantially L-shape in cross section and terminate at their outer ends in the glass contacting portions or beads 16 which engage the outer faces of the glass sheets A and B and the inner surfaces of which are also rounded to permit proper angular adjustment of said sheets.

The means for actuating the wing members 13 and 14 comprises a wedge element 17 positioned between said wings and consisting of a bead molding, said molding carrying a plurality of bolts 18 permanently spaced at required intervals and having their heads fixedly secured within said molding.

The bolts 18 are received between the wing members and are adapted to extend through openings 18' in the rear stationary member 10, terminating in the cavity or channel 19 formed in said stationary member. Loosely received upon the inner end of each bolt 18 is a spring washer 20, while threaded upon said bolt outwardly of said washer is a nut 21. Upon tightening of the nuts 21 the wedge 17 will be drawn inwardly and the opposite sides of said wedge, riding upon the cam surfaces C of the wing members 13 and 14 will cause them to swing outwardly about their hinge connections (lips 12 and flanges 15), whereby the glass contacting beads 16 will be moved to engage the glass sheets A and B and firmly clamp the said sheets in place between the said beads 11 and 16. After the glass sheets have been clamped in position, a cover plate 22 may be secured to the back of the rear stationary member 10. Any type of cover can be used, the one illustrated being a snap-on type which has been found to be entirely satisfactory.

In practice, it is preferred that the corner bar, when shipped into the field for installation, be assembled without the plate glass and without the cover plate 22 attached, but with the bolts 18 extending through the rear member 10. When installing the corner bar, it would then be necessary to first loosen the nuts 21 until the wedge member or bead molding 17 could be pulled out sufficiently far to allow the wing members 13 and 14 to be disengaged from the lips 12. The rear member 10 of the bar, together with the bead molding 17 and bolts 21, are then set in back of the exact intersection point of the glass sheets, and the rear member anchored at top and bottom in any desired manner. While it is preferred that the rear member be set prior to the setting of the glass sheets, this is not essential. The glass sheets A and B are then set in position, with the inner faces thereof in engagement with the fixed beads 11 on the rear member 10. The flanges 15 of the wing members 13 and 14 are then pivotally associated with the lips 12 on the rear member and the said wing members swung outwardly until the beads 16 thereof engage the outer faces of the glass sheets. It will be apparent that no matter what the angle of the glass sheets may be, the wing members will automatically have perfect bearing on said sheets due to the hinging of said wing members and the curved glass contacting surfaces of the beads 11 and 16. The bead molding 17 is then moved inwardly until it wedges against the cam surfaces C of the wing members after which the nuts 21 are run down until the spring washers 20 are almost but not quite flattened. The cover plate 22 is then finally applied to complete the installation.

As will be seen from the above, the glass sheets A and B can be arranged at varying angles and the wedging action used to swing the wing members into proper glass holding position, while the pressure of the bead molding 17 against the wing members can be very accurately controlled. The use of the spring washers 20 is of considerable importance since they provide a yielding cushioned pressure of the wing members upon the glass. They also act as shock absorbers to take up vibrations in the unit as well as permitting expansion and contraction of the glass and bar without causing breakage of the glass. This is due to the fact that the spring washers 20 are almost, but not completely, flattened out. In Fig. 3, the spring washer is shown in full lines as being arched away from the rear or body member before the nuts 21 are tightened, whereas in broken lines the said spring washer is shown as being almost, but not quite, flattened out after said nuts are tightened. The spring washers furthermore act as a gauge to indicate to the operator when the nuts 21 have been sufficiently tensioned. In other words, when the spring washers have been flattened to the desired predetermined degree, the operator will know that sufficient pressure has been applied to the glass sheets to maintain them firmly in place.

Another feature of the invention is that the individual action of each wing member 13 and 14 allows for a variation in the thickness of the two sheets of glass A and B without varying the pressure therebetween. Thus, the pressure upon the two sheets of glass can be evenly and uniformly maintained even though they may not be of exactly the same thickness. This is accomplished by forming the openings 18' in the rear member 10 slightly larger than the bolts 18, so that the bead molding 17 is permitted a limited amount of transverse movement which will allow it to automatically adjust itself to any variation in the thickness of the glass sheets.

The rear member 10 is of sufficient size and strength to do away with the necessity of additional reenforcements for large glass, but is still not large enough to appear bulky or obstruct the vision through the window. As a matter of mechanical design, the rear member 10 may be provided with a reenforcing web 23 which does not in any way interfere with the operation of the side wings and associated parts, but does lend greater rigidity and strength to the unit as a whole.

Figure 4:
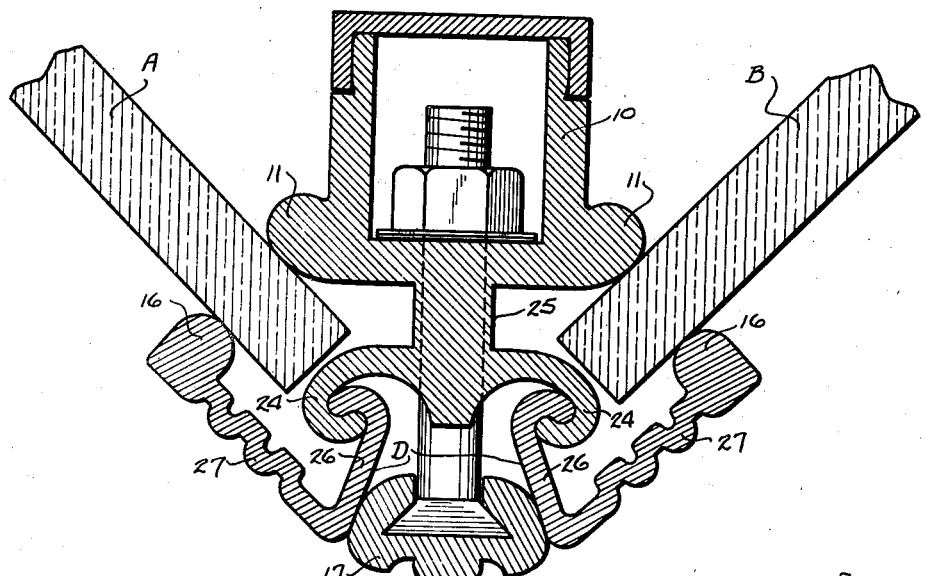
Fig. 4 is a horizontal transverse sectional view through a slightly modified form of corner bar.

In Fig. 4 is illustrated a slightly modified form of corner bar, although the principle of construction and operation is identical with that form of corner bar described above and illustrated in Figs. 1, 2 and 3. The main difference between the corner bar of Fig. 2 and the corner bar of Fig. 4 resides in the positioning of the inwardly directed lips or hinge sections on the rear member. Thus, in Fig. 4 the lips 24 are spaced from the rear member 10 and are connected therewith by a web 25. As a consequence, the hinge arms 26 of the wing members 27 are somewhat shortened. The hinge arms 26 and cam surfaces D correspond to the cam surfaces C in Fig. 2, and it will be apparent that the wedge or bead molding 17 is actuated in the same manner to urge the side wings 27 into engagement with the outer faces of the glass sheets A and B to firmly clamp the same between the glass contacting portions 11 and 16 of the rear member 10 and wing members 27 respectively.

In Fig. 5 is disclosed a division bar embodying the same principles of construction and operation as the corner bars described above. In this case, the two sheets of glass E and F may either be arranged in the same plane as indicated in full lines or may be disposed to take care of relatively wide angles as indicated by the broken lines. This bar also comprises a rear member or body portion 28 having fixed glass contacting beads 29 engaging the inner faces of the glass sheets. Hingedly carried by the body portion are the wing members 30 provided at their outer ends with glass contacting beads 31 engaging the outer faces of the glass sheets. Arranged between the wing members 30 is a wedge member 32 carried by bolts 33 passing through openings in the body portion 28 and having threaded upon their inner ends nuts 34, with the spring washers 35 being disposed between the nuts and the body portion. The wing members 30 have cam surfaces G along which the wedge member 32 rides when it is drawn inwardly.

In Fig. 6, the principle of the invention is shown as incorporated in a reverse bar wherein the glass sheets H and I extend forwardly at an angle toward the front of the window or store front. The construction of the bar is substantially the same as that shown in Fig. 2 with the exception that the body portion 36 is provided with the outwardly and forwardly directed arms 37 having glass contacting beads 38 formed at their outer ends, while the wing members 39 are relatively shorter. The wing members 39 have the glass contacting beads at their outer ends and are provided intermediate their ends with the cam surfaces J engageable by the wedge member 41.

From the above, it will be readily evident that the corner bars of Figs. 2 and 4, division bar of Fig. 5, and reverse bar of Fig. 6 all embody the same principles of construction and operate in exactly the same manner. Thus, each bar constitutes a body portion having stationary glass contacting portions and wing members hingedly associated with said body portion and adapted to be moved into glass engaging position by means of a wedge or bead molding operating between said wing members. By constructing the bars in this manner, they are universal in automatically adjusting themselves to all angles possible in a store front. In other words, if a jobber carried in stock the three types of bars disclosed, it would be possible for him to meet any situation which would be apt to occur in store front installations. That is to say, due to the construction of these bars, they can be used in fitting all angles automatically within their classified range and it is unnecessary to determine the angles formed by the glass sheets at their intersection points prior to the actual installation. No adjustments or fittings from this standpoint are necessary which greatly reduces the stock of bars a jobber is required to carry to fit all conditions. The removable side wings do away with the necessity of fitting each individual screw into the rear member at the time of installation. Furthermore, the use of tape or mastics to hold the glass in the bars is unnecessary.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. A bar of the character described for joining adjacent edges of two sheets of glass, comprising a body member having spaced glass contacting beads projecting laterally in opposite directions therefrom, forwardly projecting curved hinge portions carried by said body member and being spaced inwardly from and independent of said glass contacting beads, wing members having hook-shaped hinge portions pivotally associated with said first-named hinge portions and also having glass contacting beads, and means operable to simultaneously move said wing members into glass engaging position whereby the glass sheets are clamped between the glass contacting beads of said body member and wing members respectively.

2. A bar of the character described for joining adjacent edges of two sheets of glass, comprising a body member having spaced glass contacting beads projecting laterally in opposite directions therefrom, forwardly projecting curved hinge portions carried by said body member and being spaced inwardly from and independent of said glass contacting beads, angular wing members having hook-shaped hinge portions at their inner ends pivotally associated with said first-named hinge portions and having glass contacting beads at their outer ends, said wing members being provided intermediate their ends with substantially flat opposed cam surfaces, a wedge member received between said wing members and engaging the cam surfaces thereof, and means carried by said body member for drawing said wedge member inwardly to simultaneously move said wing members into glass engaging position whereby the glass sheets are clamped between the glass contacting beads of said body member and wing members respectively.

3. A bar of the character described for joining adjacent edges of two sheets of glass, comprising a body portion in the form of a channel member provided at the front and opposite sides thereof with laterally projecting glass contacting beads, forwardly projecting curved lips carried by said channel member and being spaced inwardly from and independent of said glass contacting beads, wing members pivotally associated with said lips and also having glass contacting beads, a wedge member received between and engaging said wing members, fastening means carried by said wedge member and passing rearwardly through said channel member for drawing the said wedge member inwardly to move said wing members simultaneously into glass engaging position whereby the glass sheets are clamped between the glass contacting beads of said channel member and wing members respectively, and a cover plate for the back of the said channel member.

4. A bar of the character described for joining adjacent edge of two sheets of glass, comprising a body portion in the form of a channel member provided at the front and opposite sides thereof with laterally projecting glass contacting beads, forwardly projecting curved lips carried by said channel member and being spaced inwardly from and independent of said glass contacting beads, angular wing members pivotally associated at their inner ends with said lips and having glass contacting beads at their outer ends, said wing members being provided intermediate their ends with substantially flat opposed cam surfaces, a wedge member received between said wing members and engaging the cam surfaces thereof, bolts carried by said wedge member and passing rearwardly through said channel member, nuts threaded upon the inner ends of said bolts for drawing the said wedge member inwardly to simultaneously move said wing members into glass engaging position whereby the glass sheets are clamped between the glass contacting beads of said channel member and wing members respectively, the inner ends of said bolts terminating within said channel member, and a removable cover plate for the back of the said channel member for covering the ends of the said bolts and the nuts carried thereby.

CLYDE D. LOWRY.